United States Patent
Feng et al.

(10) Patent No.: US 10,549,591 B2
(45) Date of Patent: Feb. 4, 2020

(54) COVER PLATE ASSEMBLY IN DRAWER STRUCTURE

(71) Applicants: Compagnie Plastic Omnium, Lyons (FR); Yanfeng Plastic Omnium Automotive Exterior Systems Co., Ltd., Shanghai (CN)

(72) Inventors: Liangjun Feng, Shanghai (CN); Jiangang Su, Shanghai (CN); Zhongyu Ma, Shanghai (CN)

(73) Assignees: Compagnie Plastic Omnium, Lyons (FR); Yanfeng Plastic Omnium Automotive Exterior Systems Co., Ltd., Shanghai (CN)

( * ) Notice: Subject to any disclaimer, the term of this patent is extended or adjusted under 35 U.S.C. 154(b) by 62 days.

(21) Appl. No.: 15/751,690

(22) PCT Filed: Aug. 17, 2016

(86) PCT No.: PCT/CN2016/095669
§ 371 (c)(1),
(2) Date: Feb. 9, 2018

(87) PCT Pub. No.: WO2017/028785
PCT Pub. Date: Feb. 23, 2017

(65) Prior Publication Data
US 2018/0236832 A1 Aug. 23, 2018

(30) Foreign Application Priority Data
Aug. 20, 2015 (CN) .......................... 2015 1 0514909

(51) Int. Cl.
*B60D 1/60* (2006.01)
*B60D 1/56* (2006.01)
*B62D 25/20* (2006.01)

(52) U.S. Cl.
CPC ............... *B60D 1/60* (2013.01); *B60D 1/565* (2013.01); *B62D 25/209* (2013.01)

(58) Field of Classification Search
CPC . B60D 1/60; B60D 1/605; B60D 1/56; B60D 1/565
See application file for complete search history.

(56) References Cited

U.S. PATENT DOCUMENTS 6,830,274 B2 * 12/2004 Burkhardt ............... B60R 13/02
280/507
8,251,414 B2 * 8/2012 Brown .................... B60R 19/48
293/102
(Continued)

FOREIGN PATENT DOCUMENTS

CN 1607126 A 4/2005
CN 201456961 U 5/2010
(Continued)

OTHER PUBLICATIONS

European Search Report and Written Opinion Application No. EP 16 836 649 dated Mar. 29, 2019 7 pages.

*Primary Examiner* — Joseph M Rocca
*Assistant Examiner* — Michael R Stabley
(74) *Attorney, Agent, or Firm* — St. Onge Steward Johnston & Reens, LLC (57) ABSTRACT

A cover plate assembly for a vehicle, characterized in that it includes:—a cover plate provided with a flat plate-like main body of the cover plate; and—a counter-part provided with a plate-like main body of the counter-part, the counter-part main body having a through-hole matching with the shape of the cover plate main body, and two guide plates projecting in the through-hole area and supporting the cover plate main body thereunder; wherein the cover plate assembly is in drawer structure, the cover plate being configured to be assembled to the counter-part by sliding along the guide
(Continued)

plates. The cover plate assembly in drawer structure is simply structured, low in cost and easy to operate.

11 Claims, 7 Drawing Sheets

(56) References Cited

U.S. PATENT DOCUMENTS

| | | | | |
|---|---|---|---|---|
| 8,562,062 | B2* | 10/2013 | Mineshima | B60R 19/023 24/682.1 |
| 8,985,661 | B2* | 3/2015 | Muller | B60R 19/023 296/1.08 |
| 9,663,049 | B2* | 5/2017 | Weigand | B60R 19/48 |
| 2008/0001383 | A1 | 1/2008 | Hodoya et al. | |
| 2012/0292930 | A1* | 11/2012 | Hermanson | B60D 1/565 293/102 |
| 2014/0183884 | A1* | 7/2014 | Takahashi | B60R 13/10 293/117 |
| 2017/0313146 | A1* | 11/2017 | Gu | B60D 1/60 |

FOREIGN PATENT DOCUMENTS

| | | |
|---|---|---|
| CN | 201703278 U | 1/2011 |
| CN | 204020442 U | 12/2014 |
| CN | 104442243 A | 3/2015 |
| CN | 204249759 U | 4/2015 |
| CN | 204547627 U | 8/2015 |
| CN | 204895333 U | 12/2015 |
| DE | 10303598 A1 | 7/2004 |
| JP | 2014091502 A | 5/2014 |
| KR | 20110137888 A | 12/2011 |

\* cited by examiner

COVER PLATE ASSEMBLY IN DRAWER STRUCTURE

TECHNICAL FIELD

The present invention relates to a cover plate used on a vehicle for covering, and more particularly to a cover plate assembly in a drawer structure.

BACKGROUND ART

Along with the development of automobile technologies and people's high requirement on aesthetic quality of vehicles, the vehicle appearance is demanded to be made increasingly finer and vehicle manufacturers spend more efforts devoted to optimization of details. When a vehicle breaks down, it is usually hauled by a trailer. At this moment, a metal tow hook of the trailer passes through a hole located on the bumper so as to connect the vehicle body. When there is no need to be connected with the trailer, the hole on the bumper is covered by a tow hook cover plate. Therefore, the tow hook cover plate, usually mounted on the bumper, is an important member of appearance and the aesthetical quality of the coordination with its surrounding parts draws more and more attention of manufacturers and customers. It's a similar case for another type of cover plate used on any other vehicle outer body part. At the same time, the vehicle appearance presents more and more diversity, and the conventional cover plate is rotary. It's difficult to set a proper rotational shaft for the rotary cover plate in certain positions due to its surface shape, since the cover plate will collide with the surrounding parts in its turning (rotation) process. This will in turn cause product abrasions and affect the appearance.

SUMMARY OF THE INVENTION

To solve the prior-art problem that a rotary cover plate will collide with the surrounding parts, the present invention is intended to provide a cover plate assembly in drawer structure.

The present invention provides a cover plate assembly for a vehicle, characterized in that it comprises:
- a cover plate provided with a flat plate-like main body of the cover plate; and
- a counter-part provided with a plate-like main body of the counter-part, the counter-part main body having a through-hole matching with the shape of the cover plate main body, and two guide plates projecting in the through-hole area and supporting the cover plate main body thereunder;

wherein the cover plate assembly is in drawer structure, the cover plate being configured to be assembled to the counter-part by sliding along the guide plates.

In a preferred embodiment according to the invention, the cover plate is further provided with a forwardly extending front snap arranged at the front edge of the cover plate main body, and hooks arranged at the lateral sides of the cover plate main body and projecting from the bottom surface of the cover plate main body; and the counter-part is further provided with a flange projecting from a bottom surface of the counter-part main body and cooperating in snap-fit with the front snap of the cover plate, and two wings projecting in the through-hole area and supporting the cover plate main body thereunder; an end of the wing forming a cantilever projection cooperating with the hook of the cover plate.

Advantageously, the forwardly extending front snap is arranged at the center of the front edge of the cover plate main body.

The cover plate could be a cover plate for a tow hook of a vehicle, a cover plate for a light washer of the vehicle, or any other cover plate arranged on the vehicle outer body part.

Advantageously, the cover plate has a front limiting rib arranged at each side of the front snap and projecting forwardly.

Advantageously, L-shaped portions are arranged at the lateral sides of the cover plate main body and projecting from the bottom surface of the cover plate main body, and the L-shaped portions and the bottom surface of the cover plate main body form a U-shape guide slot cooperating with the guide plates of the counter-part.

Advantageously, slip-proof projecting points are arranged on the top surface of the cover plate main body.

The front snap has a guiding slope, which forms with the mounting direction a snap insertion angle ranging from 20° to 40°, preferably 30°.

The flange has a groove slope, which forms with the disassembly direction a snap holding angle ranging from 50° to 70°, preferably 60°.

The cantilever projection has a projecting slope, which forms with the mounting direction a hook insertion angle ranging from 20° to 40°, preferably 30°.

The hook has a slope, which forms with the disassembly direction a hook holding angle ranging from 50° to 70°, preferably 60°.

In a preferred embodiment according to the invention, the counter-part is an L-shaped plate.

The cover plate assembly in drawer structure according to the present invention is simply structured, low in cost and also easy to operate. During the product design, an installation direction can be defined to dispose the cover plate assembly in drawer structure as long as there exists one direction enabling the cover plate to move without interference with the surrounding parts, so as to avoid collision with the surrounding parts.

DETAILED DESCRIPTION OF THE PREFERRED EMBODIMENTS

The preferred embodiments of the present invention will be provided and described in details with reference to the drawings. Hereinafter, the embodiments to be described are based on a cover plate assembly for a tow hook of a vehicle. It could be understood that other examples for any other cover plate assembly for a vehicle outer body part also fall into the protection scope of the invention.

Figure 1:
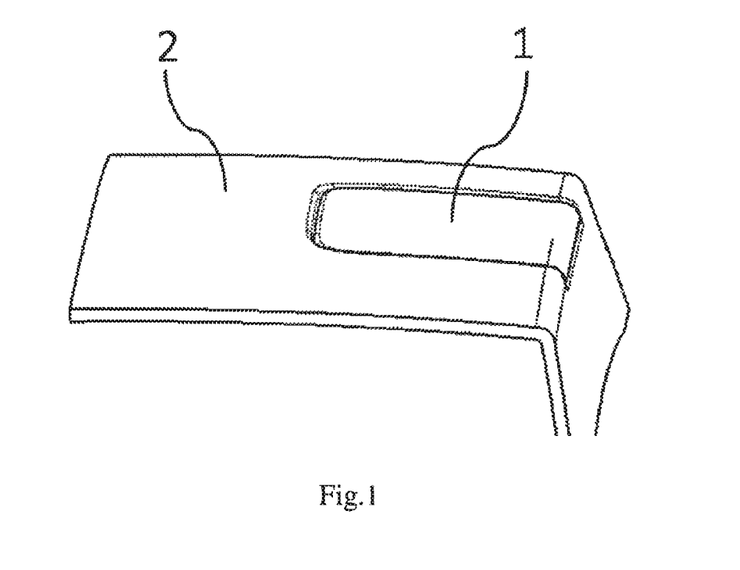
FIG. 1 illustrates a perspective view of a cover plate assembly in drawer structure in an installed state according to an embodiment of the present invention.
Figure 2:
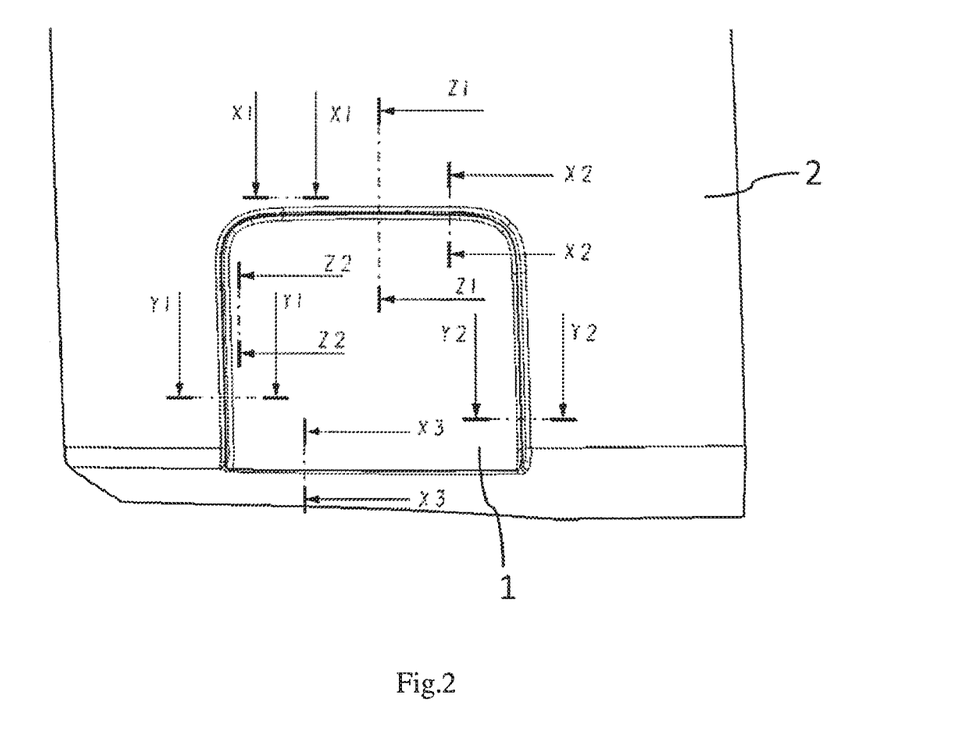
FIG. 2 illustrates a top view of the cover plate assembly in drawer structure in an installed state according to an embodiment of the present invention.

FIGS. 1 and 2 are schematic views showing the cover plate assembly in drawer structure in an installed state according to an embodiment of the present invention. The cover plate assembly in drawer structure comprises a tow hook cover plate 1 and a counter-part 2, wherein the tow hook cover plate 1 is snapped into a corresponding opening of the counter-part 2.

Figure 3:
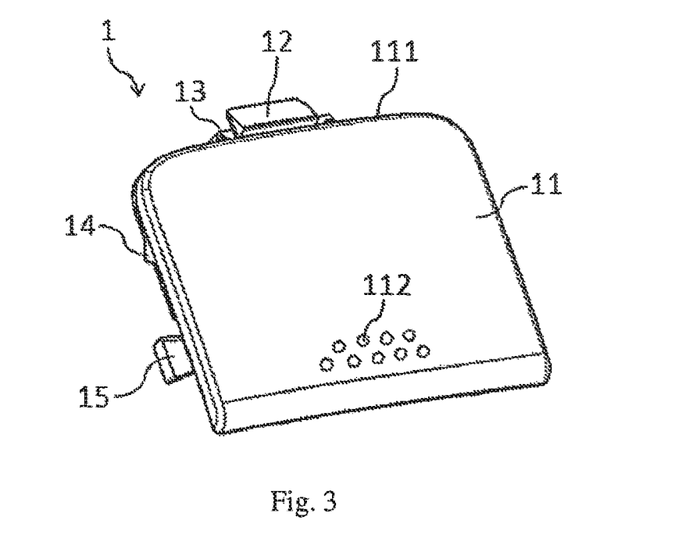
FIG. 3 illustrates a perspective view of a tow hook cover plate according to an embodiment of the present invention.
Figure 4:
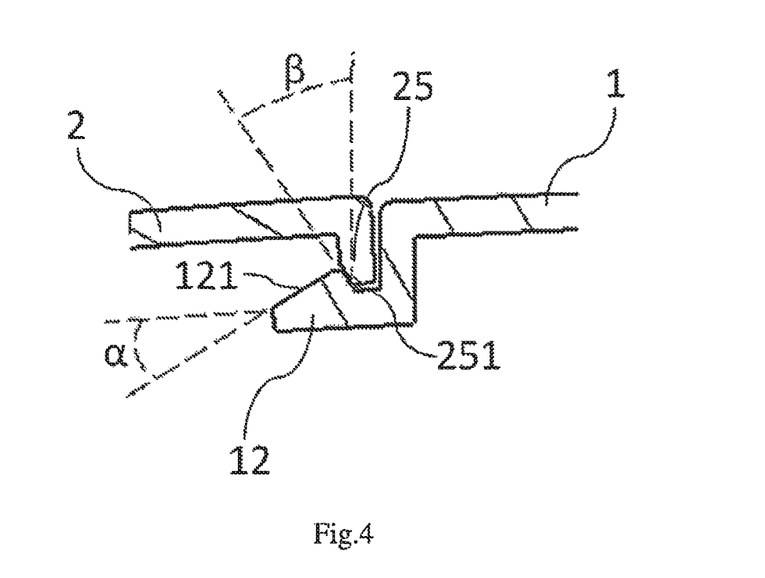
FIG. 4 illustrates a schematic view taken along the line Z1-Z1 of FIG. 2.

FIG. 3 illustrates a perspective view of the tow hook cover plate 1 according to an embodiment of the present invention. The tow hook cover plate 1 is provided with a flat plate-like cover plate main body 11. A forwardly extending front snap 12 is arranged at the center of the front edge 111 of the cover plate main body 11, and can, in an installed state, extend under the counter-part 2 to snap with it, as shown in FIG. 4.

Figure 5:
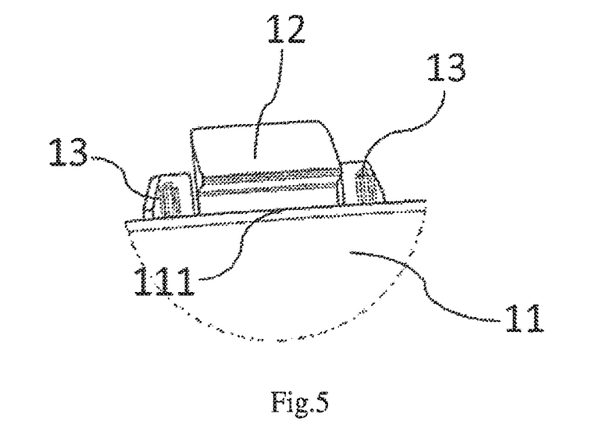
FIG. 5 shows a local enlarged view of the region of the front snap of the tow hook cover plate of FIG. 3.
Figure 6:
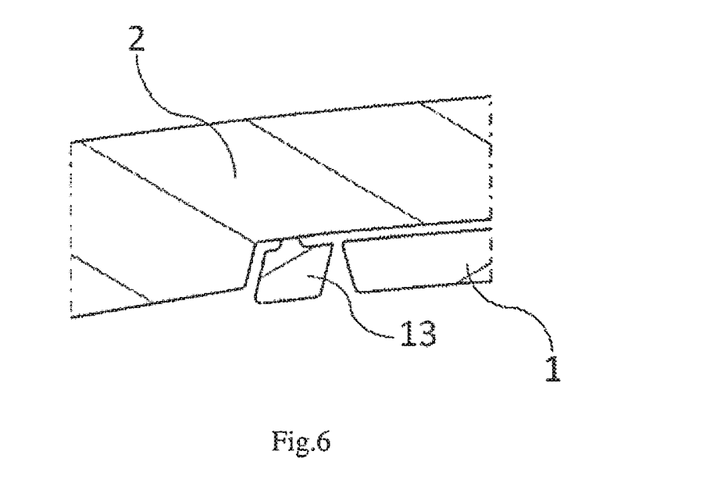
FIG. 6 illustrates a schematic view taken along the line X1-X1 of FIG. 2.
Figure 7:
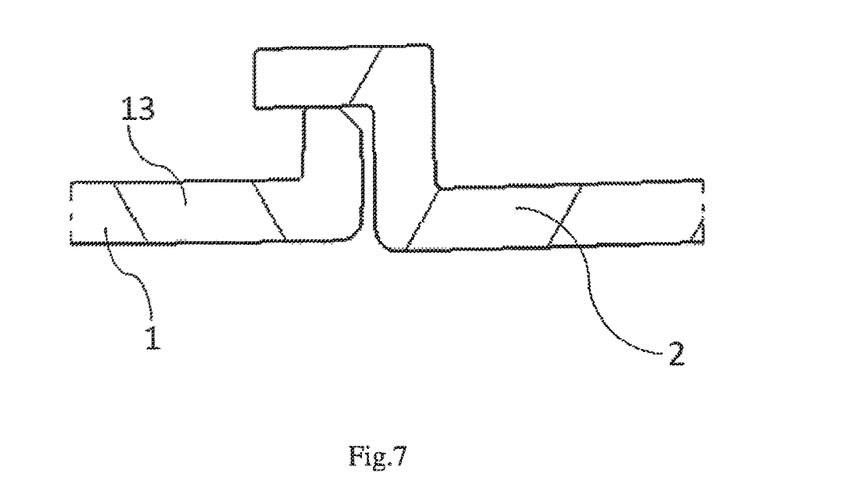
FIG. 7 illustrates a schematic view taken along the line X2-X2 of FIG. 2.
Figure 8:
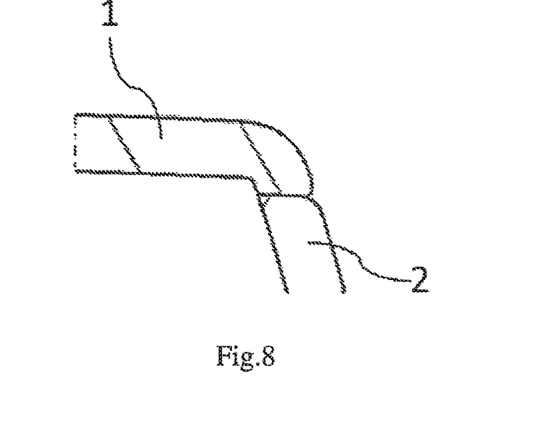
FIG. 8 illustrates a schematic view taken along the line X3-X3 of FIG. 2.
Figure 9:
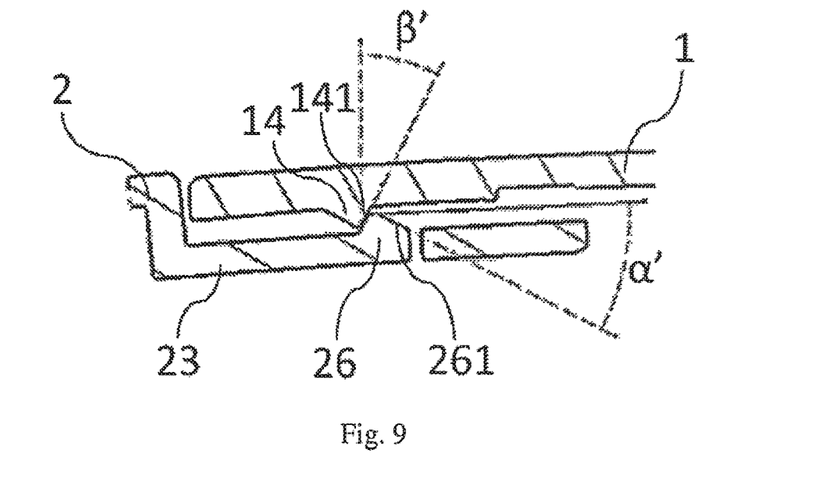
FIG. 9 illustrates a schematic view taken along the line Z2-Z2 of FIG. 2.
Figure 10:
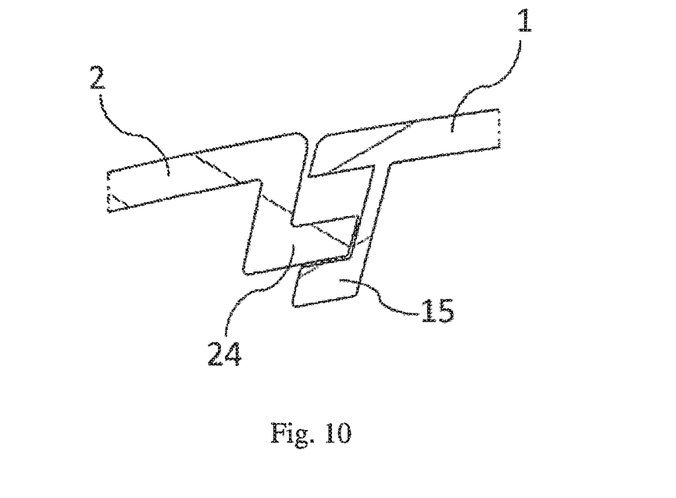
FIG. 10 illustrates a schematic view taken along the line Y1-Y1 of FIG. 2.
Figure 11:
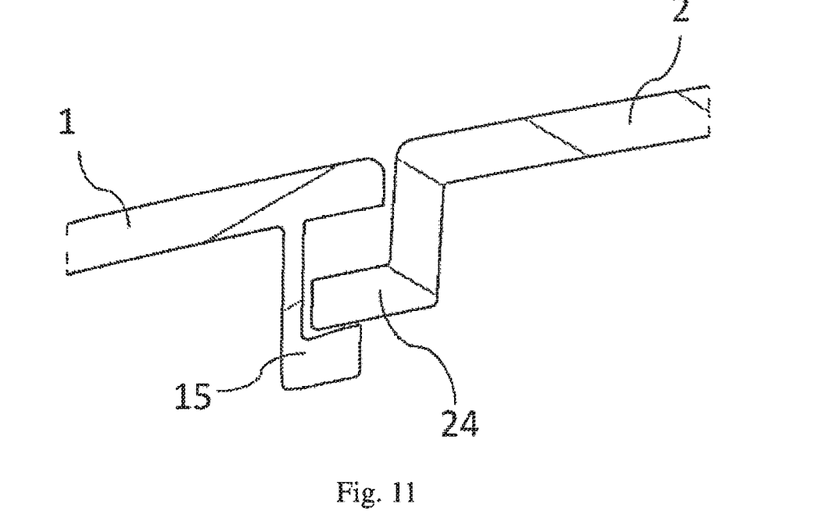
FIG. 11 illustrates a schematic view taken along the line Y2-Y2 of FIG. 2.

FIG. 5 illustrates a partially enlarged view of the front snap 12. Two front limiting ribs 13 which also projects forwardly from the front edge 11 of the cover plate main body 11 are respectively arranged at the lateral sides of the front snap 12, and also can, in an installed state, extend under the counter-part 12 to snap with it, as shown in FIGS. 6 and 7. Further, the rear edge of the cover plate main body 11 abuts against the counter-part 2, as shown in FIG. 8. Turning back to FIG. 3, hooks 14 are arranged at the lateral sides of the cover plate main body 11 and project from the bottom surface of the cover plate main body, and in an installed state, the hooks 14 abut against the upper part of the counter-part 2 to cooperate with it, as shown in FIG. 9. Back to FIG. 3 again, L-shaped portions 15 are arranged at the lateral sides of the cover plate main body 11 and project from the bottom surface of the cover plate main body, and the L-shaped portions 15 also extend under the counter-part 2 to cooperate with it, as shown in FIGS. 10 and 11. In addition, slip-proof protruding points 112 are arranged on the top surface of the cover plate main body 11, as shown in FIG. 3, and the slip-proof protruding points 112 provide great friction when an operator pushes or pulls the tow hook cover plate 1, so as to facilitate removal thereof in a reverse direction.

Figure 12:
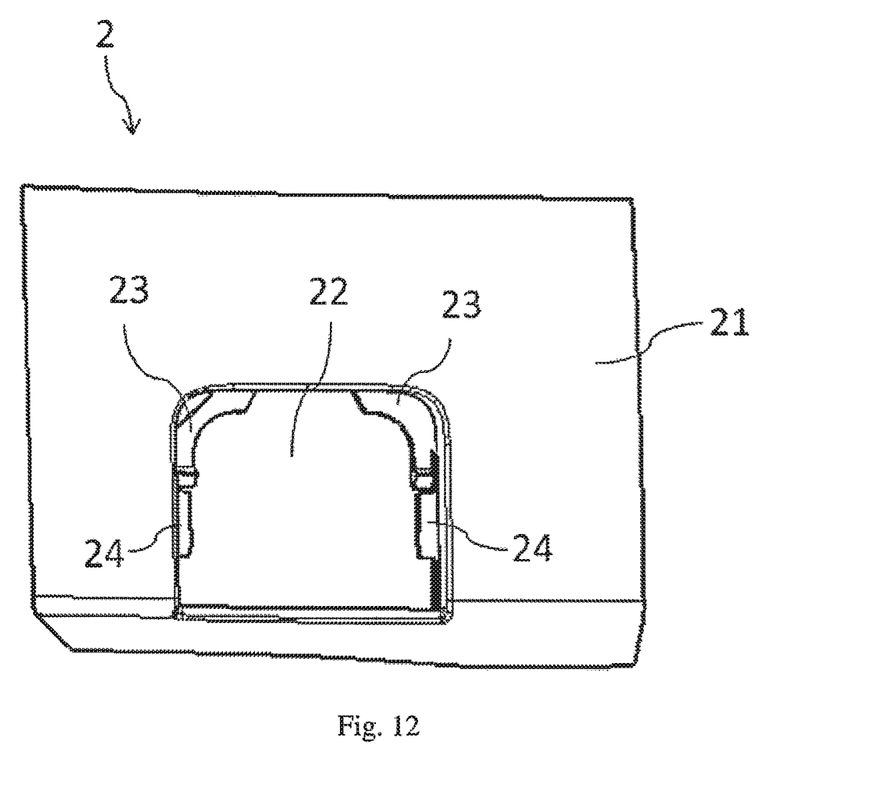
FIG. 12 illustrates a perspective view of a counter-part according to an embodiment of the present invention.
Figure 13:
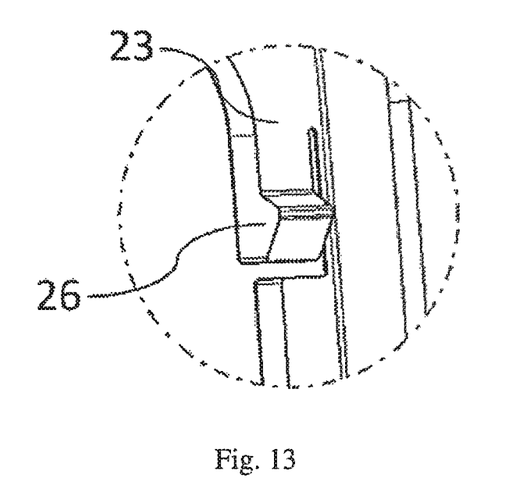
FIG. 13 illustrates a partially enlarged view of the wing of the counter-part.
Figure 14:
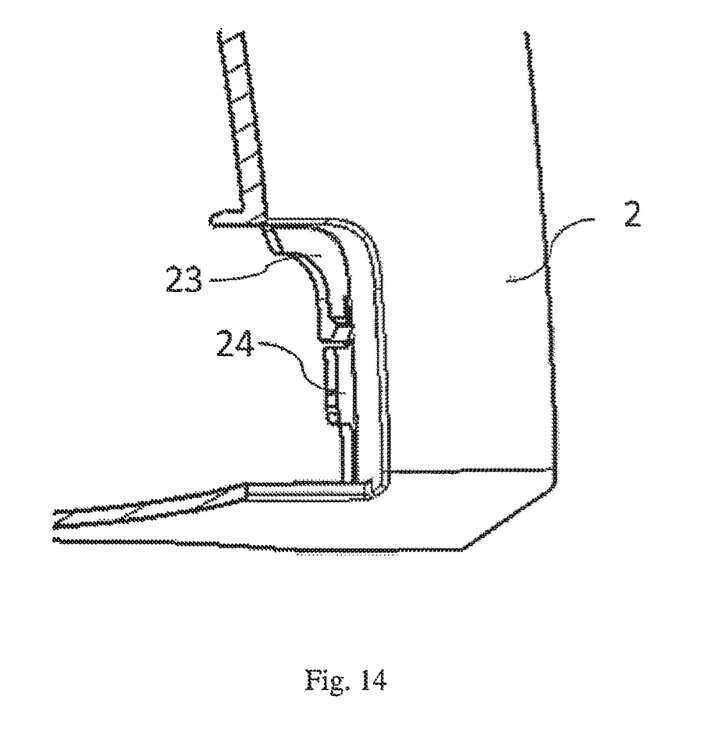
FIG. 14 illustrates a partially enlarged view of the guide plate of the counter-part.

FIG. 12 illustrates a perspective view of the counter-part 2 according to an embodiment of the present invention. The counter-part 2 is an L-shaped plate (as shown in FIG. 1) and has a counter-part main body 21. The counter-part main body 21 has a through-hole 22 matching with the shape of the cover plate main body 11 so that the cover plate main body 11 can be accommodated in the through-hole 22 to cooperate with it. The counter-part main body 21 has two wings 23 and two guide plates 24 projecting from the through-hole area 22, and in an installed state, the two wings 23 and the two guide plates 24 are supported at the lower portion of the cover plate main body 11 to cooperate with it. As shown in FIG. 4, the counter-part 2 has a flange 25 projecting from the bottom surface thereof, and the flange 25 snaps into the groove of the front snap 12 so as to limit the position of the tow hook cover plate 1 and the counter-part 2 by way of snapping. To be specific, the front snap 12 has a guiding slope 121, which forms with the horizontal direction (mounting direction) an angle called a snap insertion angle α. The flange 25 has a groove slope 251, which forms with the vertical direction (disassembly direction) an angle called a snap holding angle β. Preferably, the snap insertion angle α ranges from 20° to 40°, and the snap holding angle β ranges from 50° to 70°, so as to meet the requirements for easy installation without slippery. FIG. 13 is a partially enlarged view of the wing 23, the end of which forms a cantilever projection 26. As shown in FIG. 9, during the installation, the hooks 14 of the tow hook cover plate 1 slip by the cantilever projection 26 and then snap with it, so as to limit the position of the tow hook cover plate 1 and the counter-part 2 by way of snapping. To be specific, the cantilever projection 26 has a projecting slope 261, which forms with the horizontal direction (mounting direction) an angle called a hook insertion angle α'. The hook 14 has a hook slope 141, which forms with the vertical direction (disassembly direction) an angle called a hook holding angle β'. Similarly, the hook insertion angle α' ranges from 20° to 40°, and the hook holding angle β' ranges from 50° to 70°, so as to meet the requirements for easy installation without slippery. FIG. 14 is a partially enlarged view of the guide plate 24 extending in the horizontal direction (mounting direction) and forming a guide element. As shown in FIGS. 10 and 11, the L-shaped portions 15 projecting from the bottom surface of the tow hook cover plate 1 form a U-shape guide slot with the bottom surface of the cover plate main body 11. During installation, the guide plate 24 serving as a guide element slip in the U-shape guide slot so as to be limited in position by the guide elements at the lateral sides and the U-shape guide slot. Preferably, the effective overlapping length between the guide plates and the U-shape guide slot is about 7 mm so as to effectively guarantee the strength of the guide slot and the guiding effect. Moreover, the structure of the guide plate can control the sliding travel of the tow hook cover plate 1 so as to prevent slippery in the sliding direction.

Figure 15:
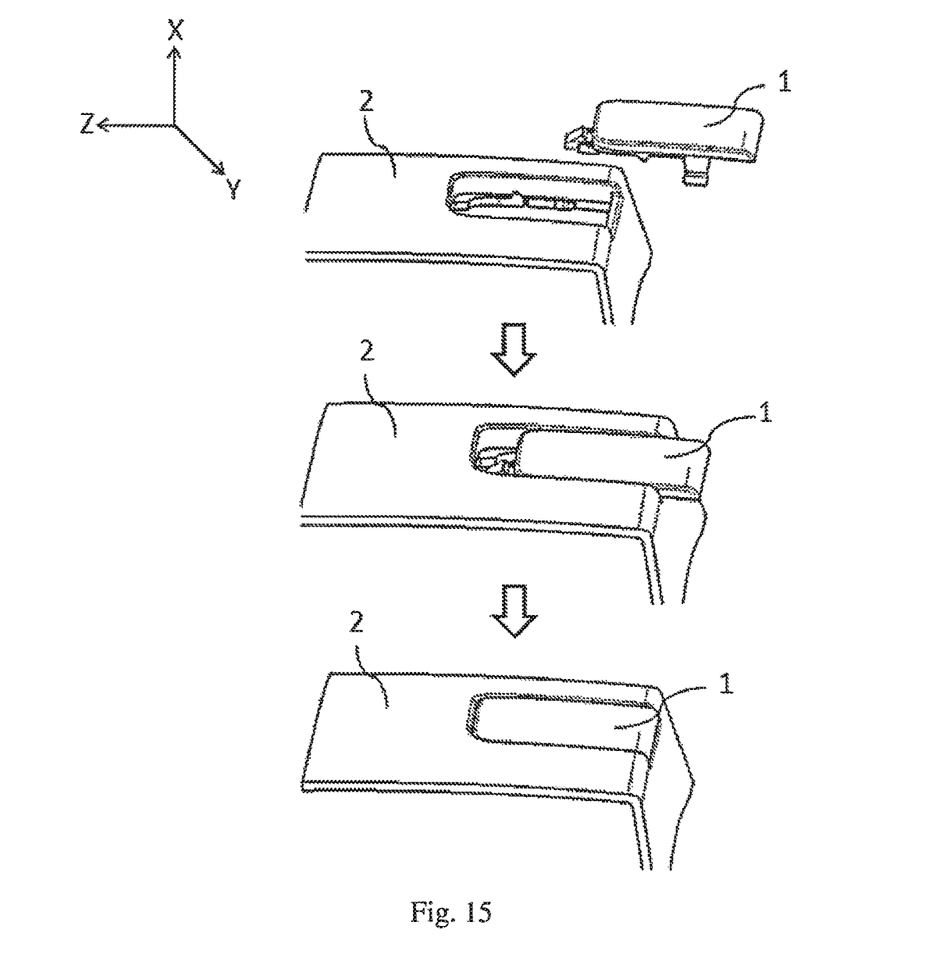
FIG. 15 illustrates a schematic view showing the installation process of the cover plate assembly in drawer structure according to an embodiment of the present invention.

FIG. 15 illustrates a schematic view showing the installation process of the cover plate assembly in drawer structure according to an embodiment of the present invention.

First, the tow hook cover plate 1 is put into the corresponding opening of the counter-part 2 in the X direction; then, the tow hook cover plate 1 is pushed in the Z direction; and at last, the position of the tow hook cover plate 1 and the counter-part 2 are limited by way of snapping. The position-limiting structures in the X direction include those shown in FIGS. 6 to 8, which are mainly used for ensuring appearance matching between the tow hook cover plate 1 and peripheral elements; the position-limiting structures in the Y direction include those shown in FIGS. 10 and 11, which are mainly for guiding and position limiting and to guarantee an effective installation and the smoothness with peripheral elements after installation; and the position-limiting structures in the Z direction includes those shown in FIGS. 4 and 9, which is mainly for guaranteeing the firmness of connection between the tow hook cover plate 1 and the counter-part 2.

It should be understood that the above embodiments are explained by taking the cooperation between the tow hook cover plate and the counter-part as an example, but in fact, the cover plate with similar structures can be assembled by utilizing the drawer structure, for instance, a small cover plate installed in the area under the front headlights for covering holes (holes left due to differences of parts in different configurations).

The above is only the preferred embodiments of the present invention and is not intended to limit the scope of the present invention. Variations can be also be made to the embodiments of the present utility model, that is, any simple and equivalent variations and modifications made according to the claims and description of the present application for invention fall into the protection scope defined in the claims of the present invention. Those that are not described in detail herein are customary technical content.

The invention claimed is:

1. A cover plate assembly for a vehicle, comprising:
   a cover plate provided with a cover plate main body which is flat; and
   a counter-part provided with a counter-part main body, the counter-part main body having a through-hole matching with the shape of the cover plate main body, and two guide plates projecting in the through-hole area and supporting the cover plate main body thereunder;
   wherein the cover plate assembly is in a drawer structure such that the cover plate is configured to be assembled to the counter-part by sliding along the two guide plates;
   wherein an L-shaped portion is arranged at a lateral side of the cover plate main body and projects from a bottom surface of the cover plate main body, and the L-shaped portion and the bottom surface of the cover plate main body form a U-shape guide slot cooperating with the guide plates of the counter-part.

2. The cover plate assembly according to claim 1, wherein the cover plate is further provided with
   a forwardly extending front snap arranged at the front edge of the cover plate main body, and
   hooks arranged at lateral sides of the cover plate main body and projecting from a bottom surface of the cover plate main body; and
   the counter-part is further provided with
   a flange projecting from a bottom surface of the counter-part main body and cooperating in snap-fit with the front snap of the cover plate, and
   two wings projecting in the through-hole area and supporting the cover plate main body thereunder; an end of at least one of the two wings forming a cantilever projection cooperating with the hook of the cover plate.

3. The cover plate assembly according to claim 2, wherein the forwardly extending front snap is arranged at the center of the front edge of the cover plate main body.

4. The cover plate assembly according to claim 2, wherein the cover plate has a front limiting rib arranged at each side of the front snap and projecting forwardly.

5. The cover plate assembly according to claim 2, wherein the front snap has a guiding slope, which forms with a mounting direction a snap insertion angle ($\alpha$) ranging from 20° to 40°.

6. The cover plate assembly according to claim 2, wherein the flange has a groove slope, which forms with a disassembly direction a snap maintenance angle ($\beta$) ranging from 50° to 70°.

7. The cover plate assembly according to claim 2, wherein the cantilever projection has a projecting slope, which forms with a mounting direction a hook insertion angle ($\alpha'$) ranging from 20° to 40°.

8. The cover plate assembly according to claim 2, wherein the hook has a hook slope, which forms with a disassembly direction a hook maintenance angle ($\beta'$) ranging from 50° to 70°.

9. The cover plate assembly according to claim 1, wherein the cover plate is a cover plate for a tow hook of the vehicle.

10. The cover plate assembly according to claim 1, wherein slip-proof projecting points are arranged on a top surface of the cover plate main body.

11. The cover plate assembly according to claim 1, wherein the counter-part is an L-shaped plate.

* * * * *

UNITED STATES PATENT AND TRADEMARK OFFICE
CERTIFICATE OF CORRECTION

PATENT NO. : 10,549,591 B2
APPLICATION NO. : 15/751690
DATED : February 4, 2020
INVENTOR(S) : Liangjun Feng et al.

Page 1 of 1

It is certified that error appears in the above-identified patent and that said Letters Patent is hereby corrected as shown below:

On the Title Page

Item (71), Line 1:
"Compagnie Plastic Omnium, Lyons"
Should be changed to:
-- Compagnie Plastic Omnium, Lyon --

Item (73), Line 1:
"Compagnie Plastic Omnium, Lyons"
Should be changed to:
-- Compagnie Plastic Omnium, Lyon --

Signed and Sealed this
Fourteenth Day of April, 2020

Andrei Iancu
*Director of the United States Patent and Trademark Office*